May 1, 1951          G. A. THOMPSON          2,551,473
FISHING REEL
Filed March 20, 1946
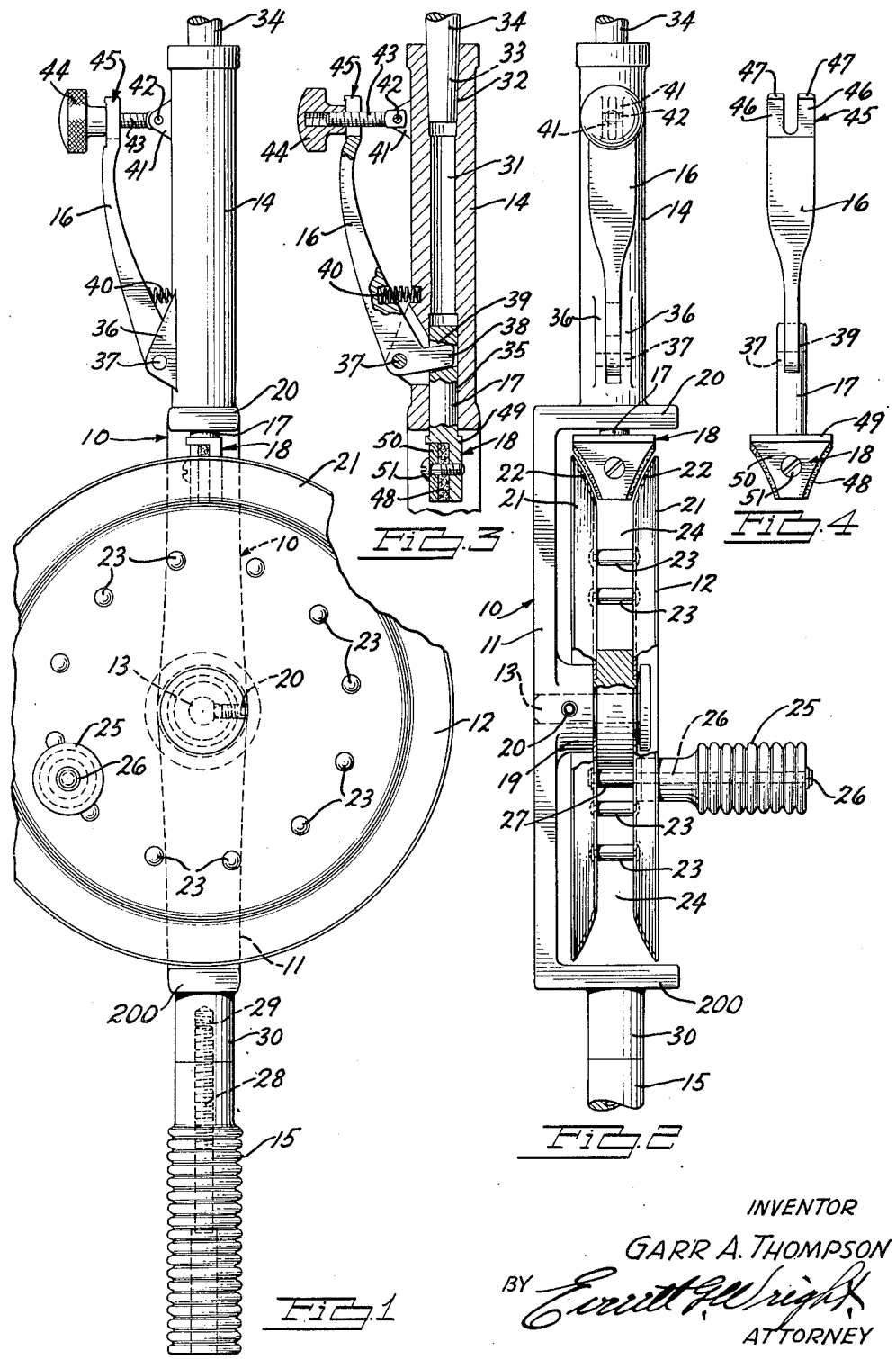
INVENTOR
GARR A. THOMPSON
BY Everett G. Wright
ATTORNEY Patented May 1, 1951

2,551,473

UNITED STATES PATENT OFFICE 2,551,473

FISHING REEL

Garr A. Thompson, Dearborn, Mich.

Application March 20, 1946, Serial No. 655,856

5 Claims. (Cl. 43—20)

This invention relates to improvements in fishing reels of the type generally employed in surf fishing or deep sea trolling for fish of the larger varieties.

The primary objects of the invention are to provide a simply constructed inexpensive fishing reel including effective means for winding fish line thereon and paying the line out under the desired tension including quickly releasable means for holding the line at the desired tension while waiting for a strike and playing a fish after a strike, all with an immediately responsive positive manual control.

Other objects of the invention will become apparent by reference to the following detailed description taken in connection with the accompanying drawing, in which:

Fig. 1 is a side elevational view of a fishing reel embodying the invention.

Fig. 2 is a top elevational view of the fishing reel disclosed in Fig. 1, certain portions thereof being broken away to illustrate the construction thereof more clearly.

Fig. 3 is a fragmentary vertical sectional view of the fishing reel disclosed in Figs. 1 and 2 taken along the line 3—3 of Fig. 2 showing the mechanism employed for controlling the tension under which the line is held and payed out during fishing therewith.

Fig. 4 is a top elevational view of the reel brake shoe and hand control lever removed from the fishing reel.

Referring now to the drawing wherein like numerals refer to like and corresponding parts throughout the several views, the fishing reel disclosed for the purpose of illustrating the invention comprises a frame 10 composed of a laterally offset channel shaped central portion 11 into which a reel 12 is journaled on a bearing pin 13 for rotation in alignment with an upper hand grip 14 preferably formed integral with the frame 10 and a lower hand grip 15 removably fixed to the said frame 10, and a braking mechanism composed of a hand control lever 16 mounted on the upper hand grip 14 adapted to actuate a brake rod 17 carrying a brake shoe 18 which is brought into engagement with the reel 12 for controlling the rotation thereof and the tension under which line wound on the said reel 12 is held and payed out while fishing with the said fishing reel, all as hereinafter more fully described in detail.

The frame 10 is preferably cast of aluminum or other light metal and the channel shaped central portion 11 thereof is provided with a hub 19 disposed midway between the upper flange 20 and lower flange 200 of the said channel shaped central portion 11. The hub 19 is axially bored to receive the headed bearing pin 13 and radially bored and tapped to accommodate the socket headed set screw 26 which is employed to fix the bearing pin 13 in its proper axial adjustment to permit the reel 12 to rotate freely thereon.

The reel 12 is composed of a pair of oppositely disposed annular discs 21 flanged at the periphery thereof to provide outwardly curved flanges or braking surfaces 22 formed integral therewith secured together in lateral spaced relationship by a plurality of circumferentially spaced shouldered rivets 23 serving as a fish line support between the discs 21. The said fish line supports 23 are disposed sufficiently radially inward from the outer periphery of the reel 12 whereby to provide ample space 24 to receive and hold fish line when wound on the said circumferentially spaced supports 23. A hand crank 25 is journaled on a suitably shouldered rivet 26 which is riveted through the anular discs 21 with the spacer 27 therebetween, see Fig. 2. The hand crank 25 is employed to turn the reel 12 for winding fish line thereon.

The lower hand grip 15 is secured onto the frame 10 by means of an axially disposed screw 28 which threads into a threaded bore 29 in the cylindrical boss 30 formed integral with and depending from the lower flange 200 of the channel shaped central portion 11 of the reel frame 10. The upper hand grip 14 which is cylindrical in shape, is integral with and extends upwardly from the upper flange 20 of the channel shaped central portion 11 of the frame 10. The upper and lower hand grips 14 and 15 are preferably disposed on a common hand grip axis located diametrically through the center of the bearing pin 13 upon which the reel 12 is rotatably mounted. The axial center of the said reel 12 is preferably located on the said hand grip axis.

The said upper hand grip 14 is preferably bored at 31, and is provided with a tapered counterbore 32 at the top end thereof to accommodate the tapered end 33 of a fish pole 34, and is provided with a counterbore 35 at the lower end thereof to receive in reciprocating relationship the cylindrical brake rod 17 having a brake shoe 18 integral therewith and depending therefrom. A lower bifurcated boss 36 is formed integral with the said upper hand grip 14 and receives a transverse pivot pin 37 onto which the hand lever 16 is pivotally mounted. The lower end 38 of the said hand lever 16 engages the brake rod 17 at a tapered rectangular slot 39 therein in such a manner as to cause the brake rod 17 and brake shoe 18 thereon to move into engagement with the curved braking surfaces 22 of the reel 12 when the hand lever 16 is depressed. A compression spring 40 disposed between the upper hand grip 14 and the hand lever 16 urges the hand lever 16 outwardly from the upper hand grip 14 and moves the brake shoe 18 to a normal position out of engagement with the braking surfaces 22 of the reel 12 as best shown in Figs. 3 and 4.

An upper bifurcated boss 41 on the upper hand grip 14 accommodates a pivot pin 42 onto which a threaded stud 43 is pivoted. The said threaded stud 43 has a thumb nut 44 threaded on the end thereof employed to retain the hand lever 16 in any desired position when the said threaded stud 43 is pivoted between the bifurcated upper end 45 of the said hand lever 16. The outer ends 46 of the prongs of the bifurcated upper end 45 of the hand lever 16 are each provided with a nib 47 to prevent the thumb nut 44 from being urged off the said bifurcated end of the hand lever 16 when being thumbed.

The brake shoe 18 is preferably composed of a friction member 48 of leather or the like formed to contact the curved braking surfaces 22 of the reel 12 secured between the inverted L-shaped shoe member 49 formed integral with the lower end of the brake rod 17 and a clamp bar 50 by means of a stud 51 disposed through the said clamp bar 50 and friction member 48 and threaded into the said inverted L-shaped shoe member 49, see Figs. 3 and 4. The said friction member 48 extends laterally outward from both sides of the shoe member 49 and clamp bar 50 as indicated in Figs. 2 and 4 and is suitably shaped so that only the friction member 48 of the brake shoe 18 can be brought in contact with the braking surfaces 22 of the reel 12.

By manipulating the hand lever 16, the brake shoe 18 is urged into contact with the braking surfaces 22 of the reel 12 with the required pressure whereby to stop the reel 12 or restrain its rotation to the extent necessary to pay out line from the said reel 12 at the desired rate and under the desired tension. By thumbing the thumb nut 44, the hand lever 16 may be retained in the desired position with the desired restraint to rotation of the reel 12 applied through the brake shoe 18. Thus, the improved fishing reel provides in a simple effective manner the complete control of reeling and paying out line therefrom to suit the many varying conditions and requirements of surf fishing and deep sea fishing.

Although but one embodiment of the invention has been disclosed and described in detail, it is obvious that many changes in the size, shape, arrangement and detail of the various elements of the invention may be made without departing from the spirit thereof as defined by the appended claims.

I claim:

1. A fishing reel comprising a frame including a channel shaped portion and a hand grip extending from one flange thereof, a reel journaled in the said channel shaped portion of said frame having inwardly and oppositely disposed convex braking surfaces formed at the outer periphery thereof, and means comprising a narrow transverse friction element concaved complementary to the said braking surfaces for applying braking action to said reel at the braking surfaces thereof.

2. A fishing reel comprising a frame including a channel shaped portion and a hand grip formed on one flange thereof, a reel journaled in the said channel shaped portion of said frame having inwardly and oppositely disposed convex braking surfaces formed at the outer periphery thereof, a brake rod reciprocatingly mounted in said hand grip extending through the flange on which the said hand grip is formed, a brake shoe carried by the extending end of said brake rod including a narrow transverse friction element concaved complementary to the braking surfaces of said reel, and means carried by said hand grip for manually urging said friction element radially into contact with the convex braking surfaces of said reel.

3. A fishing reel comprising a frame including a channel shaped portion and a hand grip formed on one flange thereof, a reel journaled in the said channel shaped portion of said frame having inwardly and oppositely disposed convex braking surfaces formed at the outer periphery thereof, a brake rod reciprocatingly mounted in said hand grip extending through the flange on which the said hand grip is formed, a brake shoe including a transversely disposed friction element formed complementary to the braking surfaces carried by the extending end of said brake rod adapted to cooperate with the braking surfaces of said reel, means carried by said hand grip for manually urging said brake shoe into contact with the braking surfaces of said reel, and means normally urging said brake shoe radially out of engagement with the said braking surfaces of said reel.

4. A fishing reel comprising a frame including a channel shaped portion and a hand grip formed on one flange thereof, a reel journaled in the said channel shaped portion of said frame having inwardly and oppositely disposed convex braking surfaces formed at the outer periphery thereof, a brake rod reciprocatingly mounted in said hand grip extending through the flange on which the said hand grip is formed, a brake shoe including a transversely disposed friction element formed complementary to the braking surfaces carried by the extending end of said brake rod adapted to cooperate with the braking surfaces of said reel, means carried by said hand grip for manually urging said brake shoe into contact with the braking surfaces of said reel, means normally urging said brake shoe radially out of engagement with the said braking surfaces of said reel, and means for adjustably maintaining braking pressure applied by said manual braking means.

5. A fishing reel comprising a frame including a channel shaped portion and a hand grip formed on one flange thereof, a reel journaled in the said channel shaped portion of said frame including two circular outwardly dished axially spaced side members serving as braking surfaces therefor, a brake rod reciprocatingly mounted in said hand grip extending through the flange on which the said hand grip is formed, a brake shoe including a transversely disposed friction element formed complementary to the braking surfaces carried by the extending end of said brake rod formed complementary to the said reel braking surfaces adapted to cooperate therewith, hand lever actuated means carried by said hand grip for manually urging said brake shoe radially into contact with the braking surfaces of said reel, spring means normally urging said brake shoe out of engagement with the braking surfaces of said reel, and thumb actuated means for adjustably maintaining braking pressure applied by said hand lever actuated manual braking means.

GARR A. THOMPSON.

REFERENCES CITED

The following references are of record in the file of this patent:

UNITED STATES PATENTS

| Number | Name | Date |
|---|---|---|
| 1,544,128 | Budd et al. | June 20, 1925 |
| 1,625,103 | Smith | Apr. 19, 1927 |
| 1,648,824 | Rife | Nov. 8, 1927 |
| 2,190,984 | Gulbrandsen | Feb. 20, 1940 |
| 2,208,493 | Brett | July 16, 1940 |
| 2,409,098 | Benson | Oct. 8, 1946 |